US012638033B2

(12) United States Patent
Wang

(10) Patent No.: US 12,638,033 B2
(45) Date of Patent: May 26, 2026

(54) FASTENER STRUCTURE

(71) Applicant: FIVEGRAND INTERNATIONAL CO., LTD., New Taipei City (TW)

(72) Inventor: Ting-Jui Wang, New Taipei City (TW)

(73) Assignee: FIVEGRAND INTERNATIONAL CO., LTD., New Taipei City (TW)

( * ) Notice: Subject to any disclaimer, the term of this patent is extended or adjusted under 35 U.S.C. 154(b) by 0 days.

(21) Appl. No.: 19/091,884

(22) Filed: Mar. 27, 2025

(65) Prior Publication Data

US 2025/0223985 A1      Jul. 10, 2025

Related U.S. Application Data

(62) Division of application No. 18/347,596, filed on Jul. 6, 2023.

(30) Foreign Application Priority Data

Nov. 17, 2022      (TW) .................................. 111143878

(51) Int. Cl.
*F16B 5/08*               (2006.01)
(52) U.S. Cl.
CPC ............ *F16B 5/08* (2013.01); *F16B 2200/93* (2023.08)
(58) Field of Classification Search
CPC ........ F16B 5/065; F16B 5/08; F16B 2200/93; F16B 2/22; F16B 1/02; F16B 13/0825; G06F 30/17; G06F 30/20; G06F 2119/14; H05K 1/18; H05K 7/20418
See application file for complete search history.

(56) References Cited

U.S. PATENT DOCUMENTS

| | | | | |
|---|---|---|---|---|
| 10,465,735 B1* | 11/2019 | Hsieh | .................... | F16B 37/043 |
| 2007/0011852 A1* | 1/2007 | Lee | ......................... | F16B 5/065 |
| | | | | 24/458 |
| 2008/0050196 A1* | 2/2008 | Cao | ......................... | F16B 5/065 |
| | | | | 411/107 |
| 2011/0038125 A1* | 2/2011 | Cao | .................... | H01L 23/4006 |
| | | | | 361/720 |
| 2013/0183086 A1* | 7/2013 | Wang | .................... | F16B 5/0642 |
| | | | | 403/327 |
| 2016/0003271 A1* | 1/2016 | Wang | .................... | F16B 17/006 |
| | | | | 403/322.4 |
| 2016/0230791 A1* | 8/2016 | Albach | ................. | F16B 5/0657 |
| 2017/0072629 A1* | 3/2017 | Reznar | .................... | B22F 5/06 |
| 2021/0131471 A1* | 5/2021 | Wang | .................... | F16B 5/0208 |

FOREIGN PATENT DOCUMENTS

| | | |
|---|---|---|
| TW | M613176 U | 6/2021 |
| TW | 202225569 A | 7/2022 |

* cited by examiner

*Primary Examiner* — Sarang Afzali
*Assistant Examiner* — Darrell C Ford

(57)                    ABSTRACT

A fastener structure includes a rotating fastener body and a main body, the main body and the rotating fastener body are linked with each other by an anti-rotation portion. Through the structural design of the anti-rotation portion, the fastening stability can be greatly improved. Further, each component may also vary the structural configuration. A method of using the fastener structure is also introduced.

2 Claims, 20 Drawing Sheets

711

721

72

533

722

53

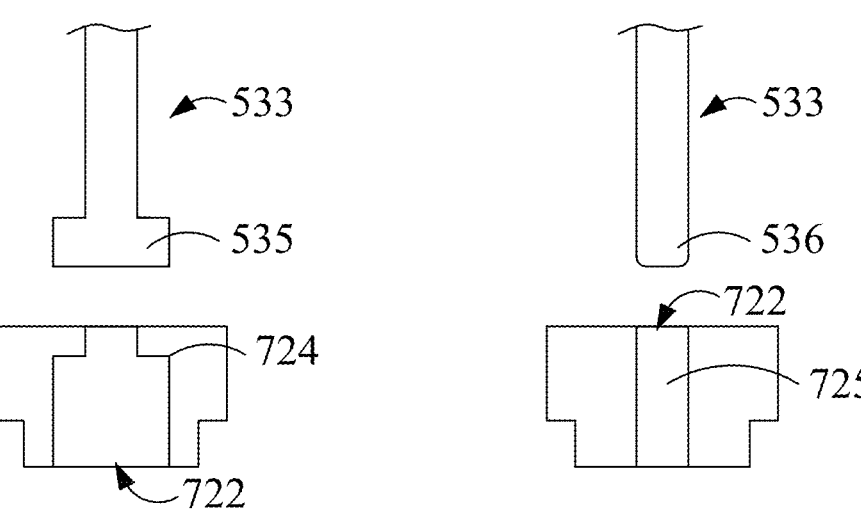
FIG. 9                    FIG. 10
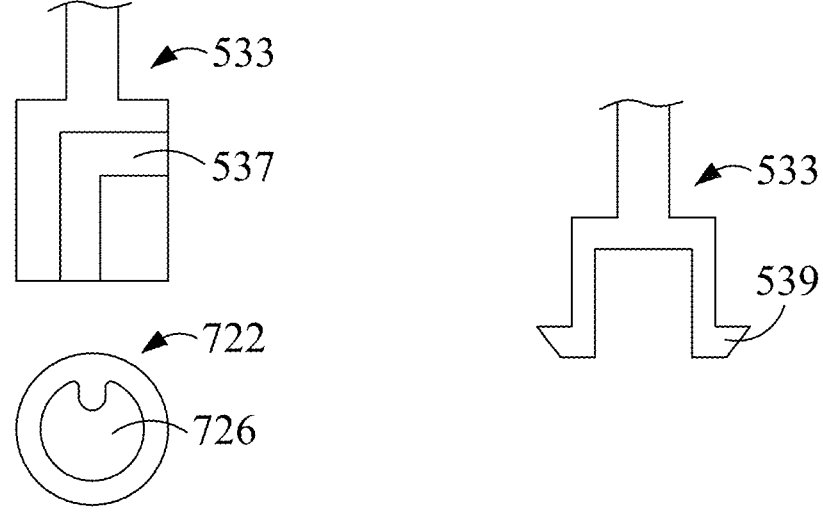
FIG. 11                   FIG. 12

627     626     62

627     626     62

9
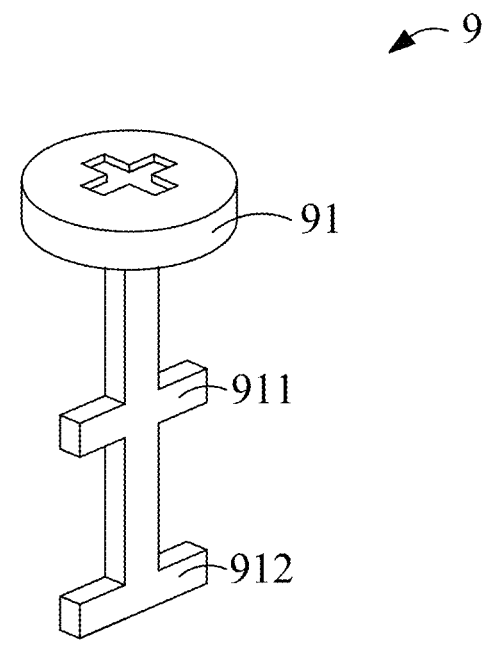
91
911
912
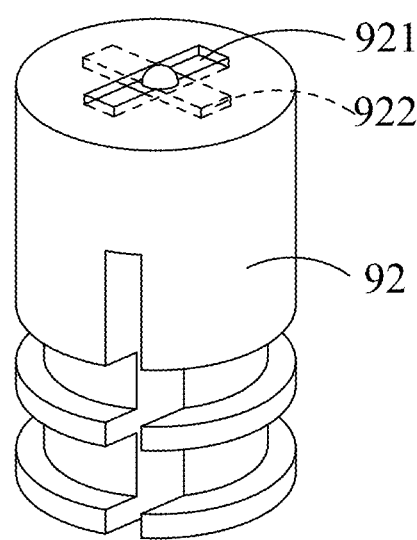
921
922
92
FIG. 35

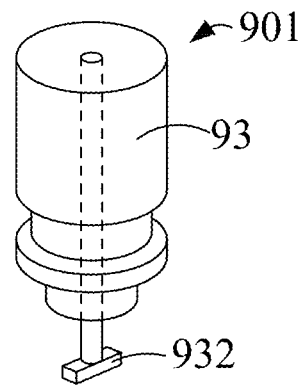
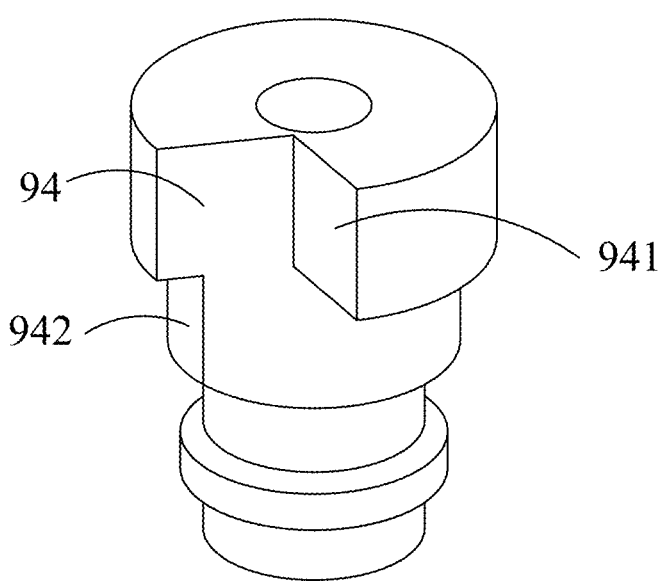
FIG. 40

942

931

941

93

93

932

FASTENER STRUCTURE

CROSS-REFERENCE TO RELATED APPLICATION

This application is a continuation application of U.S. application Ser. No. 18/347,596 filed on Jul. 6, 2023, the entire contents of which are hereby incorporated by reference for which priority is claimed under 35 U.S.C. § 120.

BACKGROUND OF THE INVENTION

1. Field of the Invention

The present disclosure relates to a technical field of a fastener for fastening objects, and in particular to a fastener structure that improves fastening stability and a method of using the fastener structure.

2. Description of the Related Art

It is often necessary to use fasteners to fasten two or more objects together to achieve a specific purpose. For example, in a host computer, heat sinks (heatsinks) are placed on a heatable component of the motherboard, and then the fasteners are used to fasten the heat sink on the motherboard, so that the heat sink can be attached to the heatable component and dissipate heat.

Generally speaking, after fasteners are fastened, the objects that are fastened together will be required to be in a stable state in order to prevent moving, rotating, or shaking, in other words, it is an urgent issue for the industry to consider how to carry out design changes to the structure of fasteners to improve the fastening stability.

BRIEF SUMMARY OF THE INVENTION

In order to overcome the disadvantages of the conventional fastener that may produce unstable fastening, the present disclosure provides a fastener structure, which greatly improves the fastening stability by various structural improvements.

The fastener structure provided by the present disclosure includes a rotating fastener body and a main body, the main body and the rotating fastener body are linked with each other by an anti-rotation component. Through the structural design of the anti-rotation component, the fastening stability can be greatly improved. Further, each part may also vary the structural configuration, as described below.

In an embodiment of the present disclosure, the anti-rotation component includes a non-circular recess section and a non-circular protrusion section, the non-circular recess section and the non-circular protrusion section are joined with each other, and the non-circular recess section is formed at the rotating fastener body, the non-circular protrusion section is formed at the main body.

In an embodiment of the present disclosure, one of the non-circular recess section and the non-circular protrusion section is semicircular, the other one of the non-circular recess section and non-circular protrusion section is a circle with a missing corner.

In an embodiment of the present disclosure, the fastener structure further includes a connecting rod, a first end part of the connecting rod penetrates the rotating fastener body, a second end part of the connecting rod is linked to the main body, the anti-rotation component includes an insert pin, the insert pin is inserted into the rotating fastener body and the first end part.

In an embodiment of the present disclosure, the fastener structure further includes a connecting rod, a first end part of the connecting rod penetrates the rotating fastener body, a second end part of the connecting rod is linked to the main body, and the anti-rotation component includes a non-circular depression and a non-circular bump, the non-circular depression and the non-circular bump correspond to each other in shape and join with each other, the non-circular depression is formed at the rotating fastener body, the non-circular bump is formed at the first end part.

In an embodiment of the present disclosure, the non-circular depression and the non-circular bump are respectively rectangular.

In an embodiment of the present disclosure, the fastener structure further includes a connecting rod, a first end part of the connecting rod penetrates the rotating fastener body, and a second end part of the connecting rod passes through the main body and further extends to form a fastening portion.

In an embodiment of the present disclosure, the fastener structure further includes a spring, the spring is sleeved on the connecting rod and abutted between the rotating fastener body and the main body.

In an embodiment of the present disclosure, the rotating fastener body includes two abutting surfaces intersecting with each other, the spring is abutted against one of the two abutting surfaces.

In an embodiment of the present disclosure, one of the two abutting surfaces of the rotating fastener body is arc-shaped.

In an embodiment of the present disclosure, each of the two abutting surfaces has a length, the length of each of the two abutting surfaces is the same as each other.

In an embodiment of the present disclosure, each of the two abutting surfaces has a length, the length of each of the two abutting surfaces is different from each other.

In an embodiment of the present disclosure, the rotating fastener body includes an operating protruding portion.

In an embodiment of the present disclosure, the fastener structure further includes an intermediator, the intermediator is located between the rotating fastener body and the spring and adjacent to the rotating fastener body, and the spring is abutted between the intermediator and the main body.

In an embodiment of the present disclosure, the fastener structure further includes a mating object, the mating object includes a non-circular mating hole, the fastening portion includes a non-circular corresponding fastening portion, and the non-circular mating hole and the non-circular corresponding fastening portion correspond to each other in shape and join with each other.

In an embodiment of the present disclosure, the non-circular mating hole and the non-circular corresponding fastening portion are respectively rectangular.

In an embodiment of the present disclosure, the fastener structure further includes a mating object and a corresponding engaging member, the mating object includes a perforation, the corresponding engaging member includes two elastic hooks and the two elastic hooks elastically pass through the perforation and fasten and abut against the butting object.

In an embodiment of the present disclosure, one of the two elastic hooks includes a protruding portion, the mating object includes a mating hole, and the protruding portion is inserted into and abutted against the mating hole.

In an embodiment of the present disclosure, the perforation and the mating hole are communicated to each other.

In an embodiment of the present disclosure, the fastener structure further includes a mating object and a corresponding engaging member, the mating object includes a non-circular aperture, the corresponding engaging member includes a non-circular protrusion, and the non-circular aperture and the non-circular protrusion correspond to each other in shape and join with each other.

In an embodiment of the present disclosure, the non-circular aperture and the non-circular protrusion are respectively semi-circular.

In an embodiment of the present disclosure, the corresponding engaging member is further soldered to the mating object.

In an embodiment of the present disclosure, the corresponding engaging member includes a fastening hole, the fastening portion engages and abuts against the fastening hole.

In an embodiment of the present disclosure, the fastening portion includes a threaded rod, the fastening hole includes a threaded hole, and the threaded rod and the threaded hole are screwed and abut against each other.

In an embodiment of the present disclosure, the fastening portion includes an outer protruding body, the fastening hole includes a recessed part, and the outer protruding body passes through the fastening hole and fastens and abuts against the recessed part.

In an embodiment of the present disclosure, the fastening portion includes a column, the fastening hole includes a hole, and the column is inserted into and abuts against the hole.

In an embodiment of the present disclosure, the fastening portion includes an inner fastening groove, the fastening hole includes a fastening bump, the fastening bump slides in the inner fastening groove and abuts against the inner fastening groove.

In an embodiment of the present disclosure, the mating object is a circuit board.

In an embodiment of the present disclosure, the fastener structure further includes a structural component, the structural component includes an assembled substrate, the assembled substrate includes a non-circular through hole, the main body includes a non-circular protruding body, and the non-circular protruding body and the non-circular through hole correspond to each other in shape and join with each other.

In an embodiment of the present disclosure, the non-circular protruding body and the non-circular through hole are respectively semi-circular.

In an embodiment of the present disclosure, the non-circular protruding body and the non-circular through hole are respectively step-shaped.

In an embodiment of the present disclosure, the structural component is a heat sink, the heat sink includes two blocking walls intersecting with each other, the rotating fastener body includes a blocking rod, and the blocking rod rotates between the two blocking walls and blocks and abuts against one of the two blocking walls.

In an embodiment of the present disclosure, the two blocking walls are perpendicular to each other.

In an embodiment of the present disclosure, the fastener structure further includes a structural component and a C-shaped elastic fastener, the structural component includes an assembled substrate, the assembled substrate includes a through hole, the main body includes an assembling portion, a cross-section of the assembling portion is I-shaped and includes an upper assembling portion and a lower assembling portion, a length of the upper assembling portion is greater than a length of the lower assembling portion, the length of the lower assembling portion is less than a diameter of the through hole, the assembling portion passes through the through hole by the lower assembling portion and abuts against the assembled substrate by the upper assembling portion, the C-shaped elastic fastener is sleeved around the assembling portion and is abutted between the assembled substrate and the lower assembling portion.

In an embodiment of the present disclosure, the C-shaped elastic fastener is formed by a heat treatment process.

In an embodiment of the present disclosure, the structural component is a cooling fan.

In an embodiment of the present disclosure, the structural component is a hard disk enclosure.

In an embodiment of the present disclosure, the rotating fastener body includes an inner concave operating section.

In an embodiment of the present disclosure, a cross-section of the inner concave operating section is one of a cross-shaped, a straight line, and a polygonal shape.

In an embodiment of the present disclosure, the polygonal shape is a pentagonal shape.

The present disclosure also provides a method of using a fastener structure, used with the fastener structure as described above. The method of using the fastener structure includes the following steps: providing the rotating fastener body; providing the main body; and movably combining the rotating fastener body and the main body, so that the rotating fastener body and the main body are linked with each other by the anti-rotation component.

The present disclosure also provides a fastener structure, including: a rotating fastener body; and a main body. The main body and the rotating fastener body are anti-rotated or limiting positions or limiting directions with each other by an anti-rotation component, or the main body and a mating object are anti-rotated or limiting positions or limiting directions with each other by an anti-rotation component, or the rotating fastener body and the mating object are anti-rotated or limiting positions or limiting directions with each other by an anti-rotation component, or the rotating fastener body and a structural component are anti-rotated or limiting positions or limiting directions with each other by an anti-rotation component.

In an embodiment of the present disclosure, the anti-rotation component includes a recess section or a protrusion section, or the recess section or the protrusion section are joined with each other, or the recess section is formed at the rotating fastener body, or the protrusion section is formed at the main body.

In an embodiment of the present disclosure, the fastener structure further includes a connecting rod, a first end part of the connecting rod penetrates the rotating fastener body, a second end part of the connecting rod is disposed at the main body, the anti-rotation component includes an insert pin, the insert pin is inserted into the rotating fastener body and the first end part.

In an embodiment of the present disclosure, the fastener structure further includes a connecting rod, a second end part of the connecting rod is disposed at the main body, and the anti-rotation component includes a recess section and a protrusion section, or the recess section or the protrusion section correspond to each other in shape and join with each other.

In an embodiment of the present disclosure, the fastener structure further includes a spring and the spring is disposed at a connecting rod and abutted between the rotating fastener body and the main body.

In an embodiment of the present disclosure, the rotating fastener body includes two abutting surfaces intersecting with each other and the spring is abutted against one of the two abutting surfaces.

In an embodiment of the present disclosure, one of the two abutting surfaces is arc-shaped or both the two are arc-shaped.

In an embodiment of the present disclosure, each of the two abutting surfaces has a length, the length of each of the two abutting surfaces is the same with each other or the length of each of the two abutting surfaces is different from each other, so that different heights are moved during rotation.

In an embodiment of the present disclosure, the fastener structure further includes an intermediator, the intermediator is located between the rotating fastener body and the spring and adjacent to the rotating fastener body, and the spring is abutted between the intermediator and the main body to stably provide the force of the spring during rotation.

In an embodiment of the present disclosure, the mating object includes an anti-rotation component, a fastening portion includes a corresponding fastening portion, and the anti-rotation component and the corresponding fastening portion are joined or anti-rotated or limiting positions with each other.

In an embodiment of the present disclosure, the fastening portion is a protruding engaging member or an inner engaging member or a screw thread body or a column or an elastic engaging member.

In an embodiment of the present disclosure, the fastener structure further includes a corresponding engaging member, the mating object includes a perforation or groove part, the corresponding engaging member includes an elastic hook, the elastic hook elastically passes through the perforation and fastens and abuts against the mating object.

In an embodiment of the present disclosure, the main body includes an anti-rotation component to mutually anti-rotate or limit positions with the perforation or groove part of the mating object.

In an embodiment of the present disclosure, the perforation or groove part and the anti-rotation component are communicated to each other, or the perforation or groove and the anti-rotation component are not communicated to each other.

In an embodiment of the present disclosure, the fastener structure further includes a corresponding engaging member, the mating object includes an anti-rotation component, and the corresponding engaging member includes an anti-rotation component, the anti-rotation component of the mating object mutually anti-rotate or limit positions with the anti-rotation component of the corresponding engaging member.

In an embodiment of the present disclosure, the mating object includes an anti-rotation component, the main body includes an anti-rotation component, the anti-rotation component of the mating object mutually anti-rotate or limit positions with the anti-rotation component of the main body.

In an embodiment of the present disclosure, the fastener structure further includes an elastic fastener, the mating object includes a through hole or groove part, the main body includes an assembling part, the elastic fastener is sleeved around the assembling part and abutted against the butting object, wherein the elastic fastener is laterally or straightly fastened into the assembling part.

In one embodiment of the present disclosure, the elastic fastener is heat treated to increase elasticity, or the elastic fastener is a C-shaped elastic fastener or a closed structure or an unclosed structure.

In an embodiment of the present disclosure, the elastic fastener has an operating part, used to be operated to laterally stretch or used to be operated to straightly stretch, or a tool is used to laterally stretch or the tool is used to straightly stretch.

In an embodiment of the present disclosure, the mating object includes two blocking walls intersecting with each other, the rotating fastener body includes a blocking part, and the blocking part rotates between the two blocking walls and blocks and abuts against one of the two blocking walls.

In an embodiment of the present disclosure, the mating object is a hard disk enclosure, a PCB, a heat dissipation element, a radiator, a heat sink, a fan, a removable hard disk enclosure, a chassis, or an IC.

The present disclosure also provides a method of using a fastener structure, used with the fastener structure as described above, and the method of using the fastener structure includes the following steps: providing the rotating fastener body; providing the main body; and combining the anti-rotation component of the rotating fastener body, or the anti-rotation component of the main body, or the anti-rotation component of the mating object, or combining arrangement and combination of the anti-rotation component of the rotating fastener body, or the anti-rotation component of the main body, or the anti-rotation component of the mating object, so that the rotating fastener body and the main body, or the main body and the mating object, or the rotating fastener body and the mating object, or different components are anti-rotated or limiting positions with each other by the anti-rotation component.

The present disclosure also provides a fastener structure, including: a rotating fastener body; a main body; and a mating object, wherein the anti-rotation component of the rotating fastener body, or the anti-rotation component of the main body, or the anti-rotation component of the mating object are combined, or arrangement and combination of the anti-rotation component of the rotating fastener body, or the anti-rotation component of the main body, or the anti-rotation component of the mating object are combined, so that the rotating fastener body and the main body, or the main body and the mating object, or the rotating fastener body and the mating object, or different components are anti-rotated or limiting positions with each other by the anti-rotation component.

The present disclosure also provides a fastener structure, including: a rotating fastener body, including an anti-rotation component and a fastening portion; and a main body, including a first anti-rotation component and a second anti-rotation component; wherein the anti-rotation component is used to move in the first anti-rotation component and the second anti-rotation component to limit positions or control the direction or switch or movement of the fastening portion.

In an embodiment of the present disclosure, the first anti-rotation component or the second anti-rotation component is upper and lower two-stage, or upper and lower two-layer, or is a grooving structure or a non-grooving structure.

In an embodiment of the present disclosure, the fastener structure further includes a torsion spring, two ends of the torsion spring are respectively assembled at the rotating fastener body and the main body, in order to automatically rotate and fasten the rotating fastener body.

In an embodiment of the present disclosure, the mating object is an aluminum object, a copper object, a metal object, an aluminum radiator, a copper radiator, a metal radiator, or a printed circuit board. The main body has a pressure applying part or a material entering part, the pressure applying part applies pressure on the mating object, so that the main body is pressed in or assembled in the mating object, or the pressure applying part applies pressure on the mating object, so that the material of the mating object enters or flows into the material entering part, in order that the main body is pressed in or assembled in the mating object, or the main body has a solderable surface for soldering to the mating object having a soldering tin layer, or the main body has a solderable surface for soldering to the mating object having a solderable surface.

In an embodiment of the present disclosure, the main body is combined with the mating object by pressure applying, expanding connection, soldering, locking, or fastening, or the main body has a soldering tin layer for soldering to the mating object, or the main body has an expanding connection part used by an applied pressure by an external force to be expanded to connect to the mating object, or the main body has a pressure applying part or a material entering part, the pressure applying part applies pressure on the mating object, so that the main body part is pressed in or assembled in the mating object, or the pressure applying part applies pressure on the mating object, so that the material of the mating object enters or flows into the material entering part, in order that the main body is pressed in or assembled in the mating object.

In an embodiment of the present disclosure, an elastic fastening component is abutted between the rotating fastener body and the main body, the main body is assembled to a structural component, the rotating fastener body is fastened to a corresponding fastener body, wherein the structural component contacts a heatable body, the elastic fastening component applies a pressurized spring force on the structural component, and the structural component applies pressure on the heatable body to be conducive to the heat dissipation of the heatable body or to assist the heatable body to dissipate heat.

BRIEF DESCRIPTION OF THE DRAWINGS

FIG. 9 is a schematic diagram illustrating a variant of the fastening portion and the fastening hole engaging and abutting against each other of an embodiment of the present disclosure.

FIG. 10 is a schematic diagram illustrating a variant of the fastening portion and the fastening hole engaging and abutting against each other of an embodiment of the present disclosure.

FIG. 11 is a schematic diagram illustrating a variant of the fastening portion and the fastening hole engaging and abutting against each other of an embodiment of the present disclosure.

FIG. 12 is a schematic diagram illustrating a variant of the fastening portion and the fastening hole engaging and abutting against each other of an embodiment of the present disclosure.

FIG. 35 is an exploded view of an embodiment of the present disclosure.

FIG. 40 is an exploded view of an embodiment of the present disclosure.

DETAILED DESCRIPTION OF THE INVENTION

In order to fully understand the objectives, characteristics, and effects of the present disclosure, the following refers to the attached drawings to describe preferable embodiments of the present disclosure.

Figure 1:
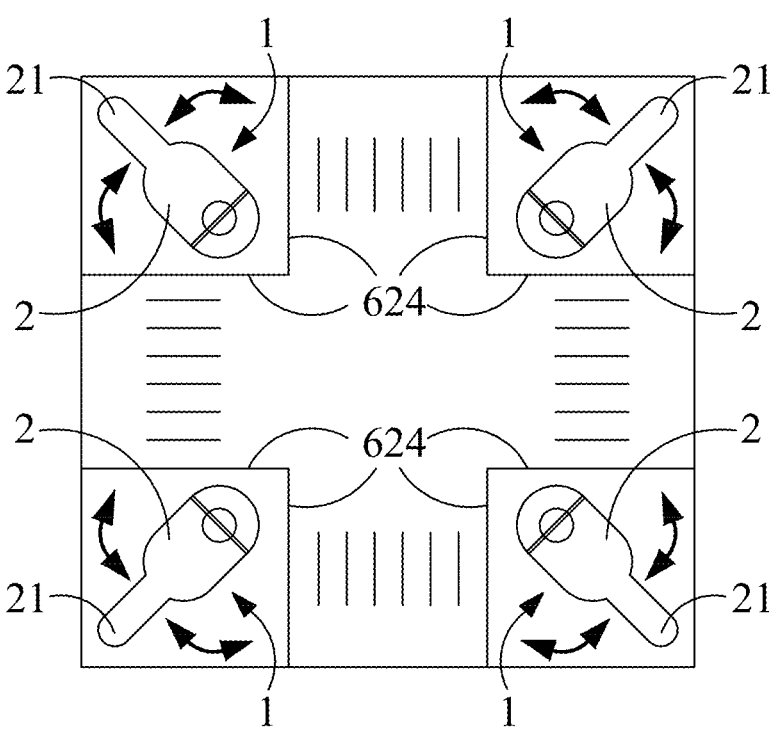
FIG. 1 is a top view illustrating a fastener structure of an embodiment of the present disclosure.
Figure 2:
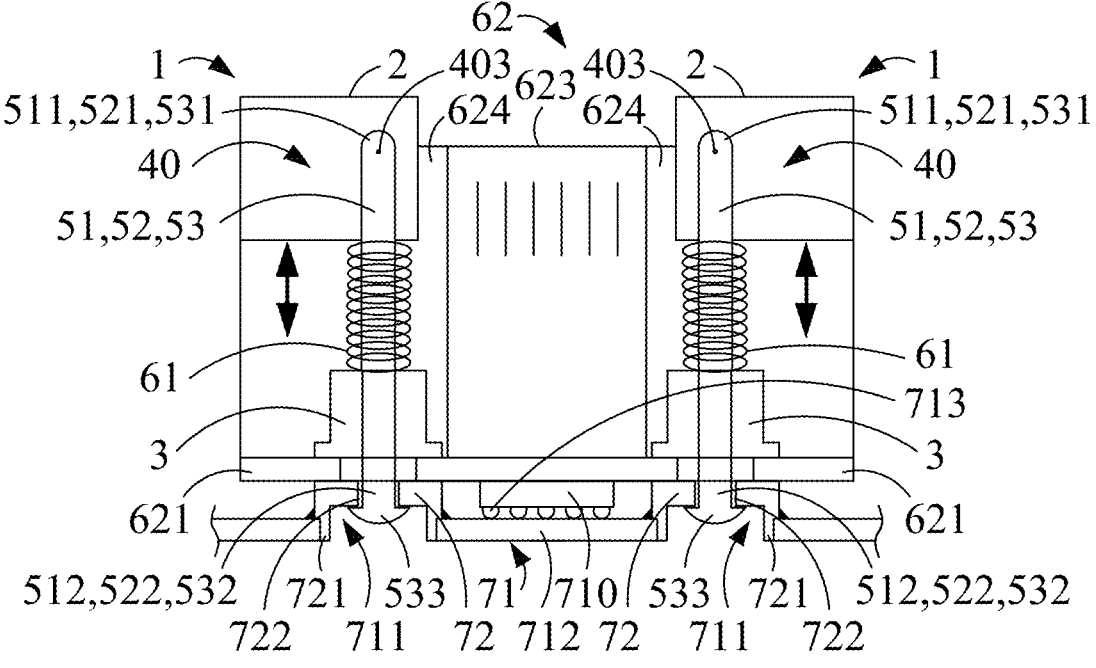
FIG. 2 is a cross-sectional view illustrating a fastener structure of an embodiment of the present disclosure.

Refer to FIG. 1 and FIG. 2. FIG. 1 is a top view of an embodiment of the present disclosure and FIG. 2 is a cross-sectional view of an embodiment of the present disclosure. FIG. 1 and FIG. 2 show a structural component 62 and a mating object 71, the structural component 62 in an embodiment may be in the form of a heat sink (heatsink), a heat dissipation body, or heat dissipation fins 623, the mating object 71 may be in the form of a circuit board 712 (PCB), and the circuit board 712 is provided with a heatable body 710 (such as an IC, CPU, or GPU), so that the structural component 62 contacts (or assembles to) the heatable body 710, and a fastener structure 1 is used to fasten the heat sink 623 to the mating object 71 at each of the four corners of the heat sink 623. The aforementioned structural component 62 and the mating object 71 as a whole may also be regarded as a mating object; wherein the heatable body 710 and the mating object 71 are soldered with a solder ball 713, so that there is an electrical transmission connection between the heatable body 710 and the mating object 71, and the structural component 62 is used to dissipate heat when the heatable body 710 is energized and heats up.

The fastener structure 1 includes a rotating fastener body 2 and a main body 3, and the main body 3 and the rotating fastener body 2 are linked with each other by an anti-rotation component 40, such as anti-rotating or limiting positions or limiting directions with each other. In addition, as far as a method of using the fastener structure 1 mentioned above is concerned, the following steps are included: providing the rotating fastener body 2; providing the main body 3; and combining, for example, movably combining the rotating fastener body 2 and the main body 3, so that the rotating fastener body 2 and the main body 3 are linked with each other by the anti-rotation component 40, such as anti-rotating or limiting positions with each other. By the structural design of the anti-rotation component 40, the effect of limiting positions and/or limiting directions can be achieved, and the fastening can be relatively more stable. Further, as detailed below, in the method of using the fastener structure 1, the anti-rotation component (such as the anti-rotation component of the rotating fastener body, or the anti-rotation component of the main body, or the anti-rotation component of the mating object) of each component can be combined, or arrangement and combination of the anti-rotation component of each component are combined so that the rotating fastener body and the main body, or the main body and a mating object, or different components are anti-rotation or limiting positions or limiting directions with each other by the anti-rotation component.

Further, the structural component 62 is in the form of the heat sink 623 as described above, the heat sink 623 includes two blocking walls 624 intersecting with each other, the rotating fastener body 2 includes a blocking rod (blocking part) 21, and the blocking rod 21 rotates in a motion space between the two blocking walls 624 and blocks and abuts against one of the two blocking walls 624. Accordingly, the effect of limiting positions and/or limiting directions can also be achieved. The aforementioned two blocking walls 624 are perpendicular to each other, certainly, it is not limited thereto, an angle between the two blocking walls 624 may be greater or less than 90 degrees.

In an embodiment of the present disclosure, an elastic element 61 is abutted between the rotating fastener body 2 and the main body 3, the main body 3 is assembled to a structural component 62, the rotating fastener body 2 is fastened to a corresponding engaging member 72 of the mating object 71, wherein an assembled substrate 621 of the structural component 62 is assembled to the heatable body 710, the elastic element 61 applies a pressurized spring force on the structural component 62, and the structural component 62 applies pressure on the heatable body 710 to be conducive to the heat dissipation of the heatable body 710 or to assist the heatable body 710 to dissipate heat.

Figure 3:
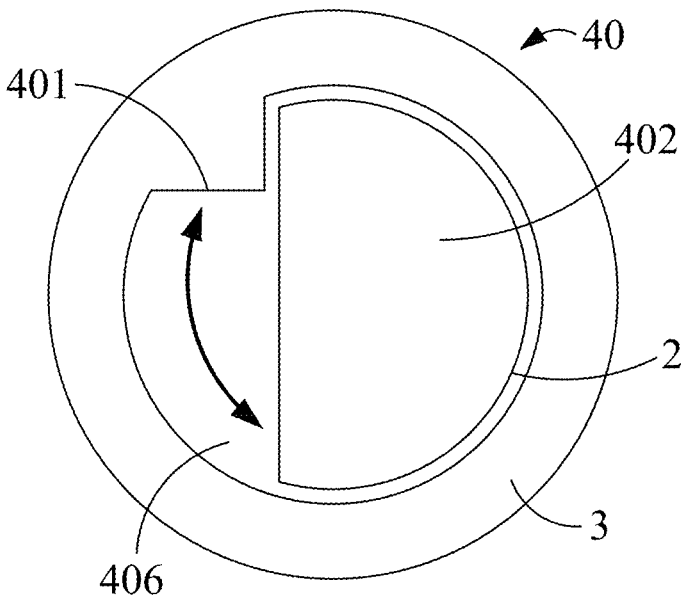
FIG. 3 is a schematic diagram illustrating an anti-rotation component of an embodiment of the present disclosure.

Refer to FIG. 3, which is a schematic diagram of an anti-rotation component of an embodiment of the present disclosure. FIG. 3 shows that the anti-rotation component 40 includes a concave part and a convex part such as a non-circular recess section 401 and a non-circular protrusion section 402. The non-circular recess section 401 and the non-circular protrusion section 402 are joined with each other. The non-circular recess section 401 is formed at the rotating fastener body 2, the non-circular protrusion section 402 is formed at the main body 3, but it is not limited thereto, and may be formed in an opposite manner. In an embodiment, one of the non-circular recess section 401 and the non-circular protrusion section 402 is semicircular (e.g., the non-circular protrusion section 402 of the main body 3 shown in FIG. 3). The other one of the non-circular recess section 401 and non-circular protrusion section 402 is a circle with a missing corner (e.g., the non-circular recess section 401 of the rotating fastener body 2 shown in FIG. 3). When the rotating fastener body 2 rotates (turns) in the motion space 406 relative to the main body 3 in an opposite direction, the missing corner part will abut against the semicircular non-circular protrusion section 402, in order to achieve the effect of anti-rotating or limiting positions or limiting directions with each other.

Referring to FIG. 1 and FIG. 2 at the same time again, the fastener structure 1 further includes a connecting rod 51, a first end part 511 of the connecting rod 51 penetrates the rotating fastener body 2, a second end part 512 of the connecting rod 51 is disposed at the main body 3, for example, linked to the main body 3. The anti-rotation component 40 includes an insert pin 403, the insert pin 403 is inserted into the rotating fastener body 2 and the first end part 511, that is, the rotating fastener body 2 and the main body 3 are connected with the connecting rod 51, and the anti-rotation component 40 in the form of the insert pin 403 achieves the effect of limiting positions and/or limiting directions. The fastener structure 1 further includes a spring 61, the spring 61 is disposed at the connecting rod 51, for example, sleeved on the connecting rod 51 and abutted between the rotating fastener body 2 and the main body 3.

Figure 4:
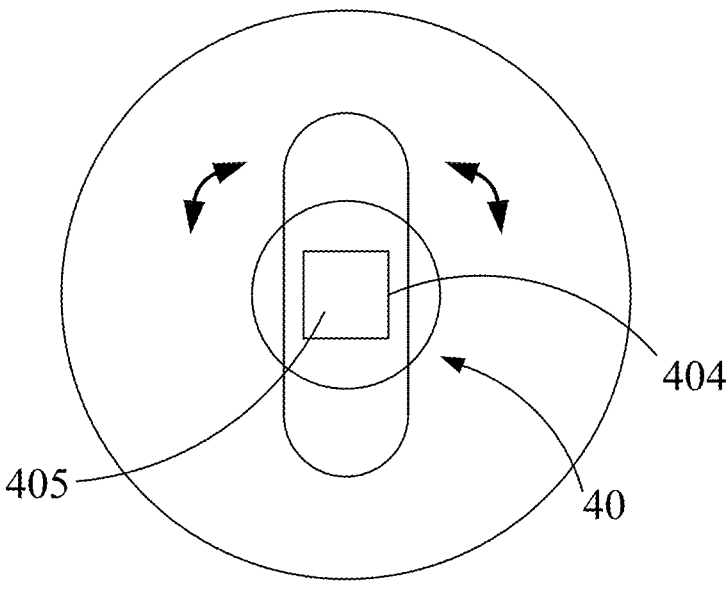
FIG. 4 is a schematic diagram illustrating various positions of the anti-rotation component of an embodiment of the present disclosure.

Refer to FIG. 4, which is a schematic diagram of an aspect of the anti-rotation component of an embodiment of the present disclosure, and also refer to FIG. 2 at the same time. The fastener structure 1 further includes a connecting rod 52, a first end part 521 of the connecting rod 52 penetrates the rotating fastener body 2, and a second end part 522 of the connecting rod 52 is disposed at the main body 3, for example, linked to the main body 3. The anti-rotation component 40 includes a concave part and a convex part such as a non-circular depression 404 and a non-circular bump 405 shown in FIG. 4. The non-circular depression 404 and the non-circular bump 405 correspond to each other in shape and join with each other, in a non-restrictive embodiment, the non-circular depression 404 is formed at the rotating fastener body 2, the non-circular bump 405 is formed at the first end part 521, and as shown in FIG. 4, the non-circular depression 404 and the non-circular bump 405 are rectangular, respectively. Accordingly, the effect of anti-rotating or limiting positions or limiting directions with each other can also be achieved. The fastener structure 1 further includes a spring 61, the spring 61 is sleeved on the connecting rod 52 and abutted between the rotating fastening body 2 and the body part 3.

Referring to FIG. 1 and FIG. 2 at the same time again, similarly, the fastener structure 1 further includes a connecting rod 53, a first end part 531 of the connecting rod 53 penetrates the rotating fastener body 2, a second end part 532 of the connecting rod 53 passes through the main body 3 and further extends to form a fastening part 533. Similarly, the fastener structure 1 further includes a spring 61, the spring 61 is sleeved on the connecting rod 53 and abutted between the rotating fastener body 2 and the main body 3.

Figure 5:
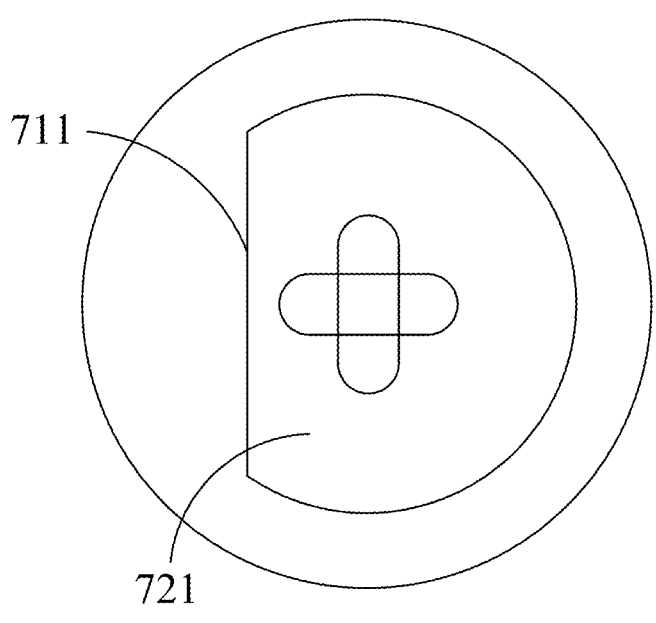
FIG. 5 is a schematic diagram illustrating the joining of mating objects and engaging members of an embodiment of the present disclosure.

Refer to FIG. 5, which is a schematic diagram of a mating object and a corresponding engaging member joining with each other of an embodiment of the present disclosure. Refer also to FIG. 2. The fastener structure 1 further includes a mating object 71 and a corresponding engaging member 72. The mating object 71 is the circuit board described above, and the mating object 71 includes a non-circular aperture 711, the corresponding engaging member 72 includes a non-circular protrusion 721, the non-circular aperture 711 and the non-circular protrusion 721 correspond to each other in shape and join with each other (i.e., forming an anti-rotation part with the function of anti-rotation or limiting positions or limiting directions). As shown in FIG. 5, the non-circular aperture 711 and the non-circular protrusion 721 are semi-circular, respectively. Accordingly, the mating object 71 and the corresponding engaging member 72 can be designed by the structure of the anti-rotation part to achieve the effect of anti-rotation or limiting positions or limiting directions (anti-rotation) between each other. Further, in order to make the corresponding engaging member 72 more firmly position on the mating object 71, the corresponding engaging member 72 may further be soldered to the mating object 71.

Figure 6:
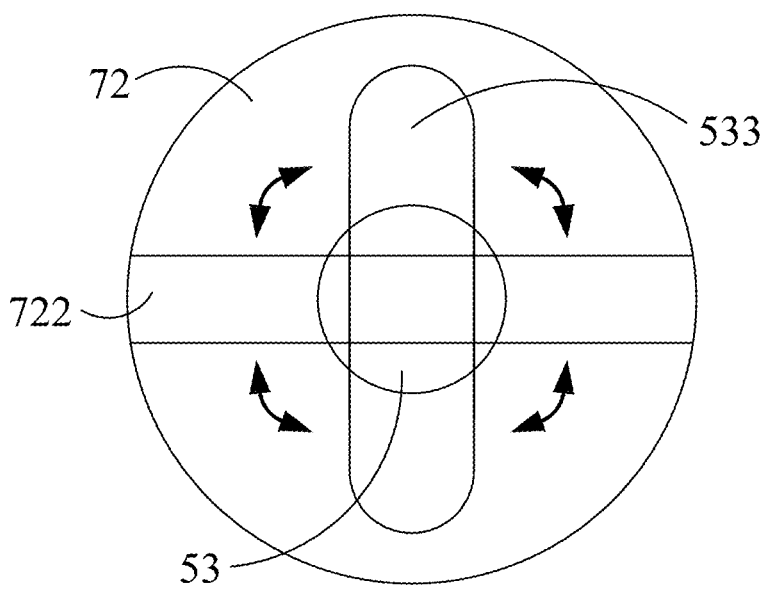
FIG. 6 is a schematic diagram illustrating a fastening portion and a fastening hole engaging and abutting against each other of an embodiment of the present disclosure.
Figure 7:
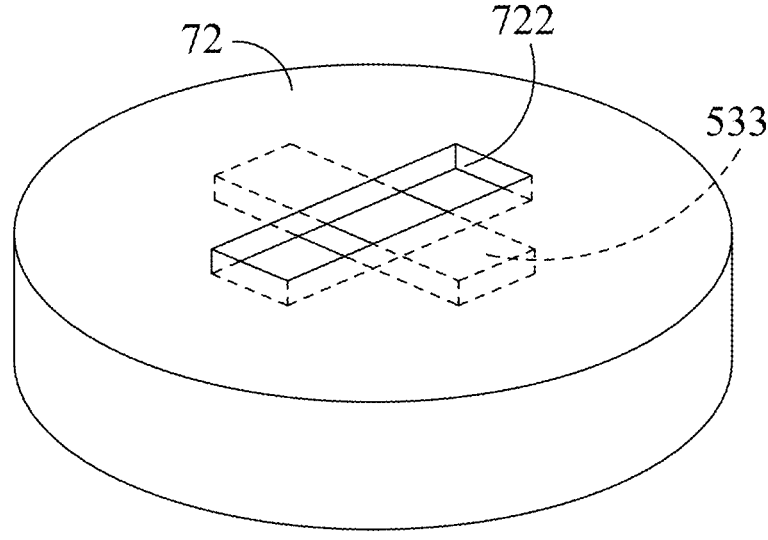
FIG. 7 is a three-dimensional view of the fastening portion and the fastening hole engaging and abutting against each other of an embodiment of the present disclosure.

Referring to FIG. 6 and FIG. 7 at the same time, FIG. 6 is a schematic diagram of a fastening portion and a fastening hole engaging and abutting against each other of an embodiment of the present disclosure, FIG. 7 is a perspective view of the fastening portion and the fastening hole engaging and abutting against each other of an embodiment of the present disclosure, and refer to FIG. 2 at the same time. The corresponding engaging member 72 includes a fastening hole 722, and the second end part 532 of the connecting rod 53 extends to form a fastening portion 533 to engage and abut against the fastening hole 722. As shown in FIGS. 6 and 7, the fastening hole 722 is a long strip and the fastening portion 533 is also a long strip. The fastening portion 533 enters the fastening hole 722 in a corresponding same direction and then rotates to produce an engaging and abutting effect (i.e., forming an anti-rotation part with the function of anti-rotation or limiting positions or limiting directions).

Figure 8:
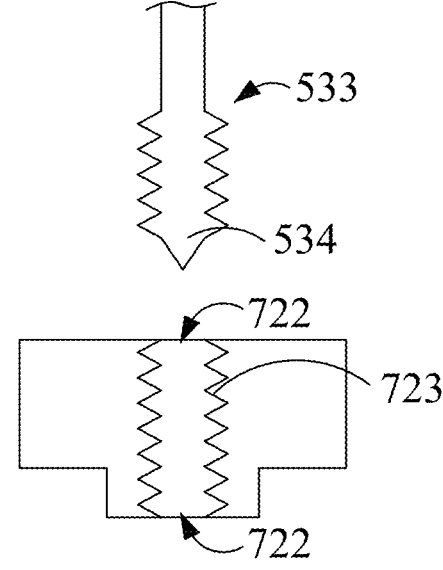
FIG. 8 is a schematic diagram illustrating a variant of the fastening portion and the fastening hole engaging and abutting against each other of an embodiment of the present disclosure.

Refer to FIG. 8, which is a schematic diagram of a variation of the fastening portion and the fastening hole engaging and abutting against each other of an embodiment of the present disclosure. As shown in FIG. 8, the fastening portion 533 includes a threaded rod (screw thread body) 534, the fastening hole 722 includes a threaded hole 723, and the threaded rod 534 and the threaded hole 723 are screwed and abutted against each other (i.e., forming an anti-rotation part with the function of anti-rotation or limiting positions or limiting directions).

Refer to FIG. 9, which is a schematic diagram of a variation of the fastening portion and the fastening hole engaging and abutting against each other of an embodiment of the present disclosure. As shown in FIG. 9, the fastening portion 533 includes an outer protruding body (protruding fastening body) 535, the fastening hole 722 includes a recessed portion 724, and the outer protruding body 535 passes through the fastening hole 722 and fastens and abuts against the recessed portion 724 (i.e., forming an anti-rotation part with the function of anti-rotation or limiting positions).

Refer to FIG. 10, which is a schematic diagram of a variation of the fastening portion and the fastening hole fastening and abutting against each other of an embodiment of the present disclosure. As shown in FIG. 10, the fastening part 533 includes a column 536, the fastening hole 722 includes a hole 725, and the column 536 is inserted into and abutted against the hole 725, for example, inserted in a tight fit manner (i.e., forming an anti-rotation part with the function of anti-rotation or limiting positions or limiting directions).

Refer to FIG. 11, which is a schematic diagram of a variation of the fastening portion and the fastening hole fastening and abutting against each other of an embodiment of the present disclosure. As shown in FIG. 11, the fastening portion 533 includes an inner fastening groove (inner fastening body) 537, the fastening hole 722 includes a fastening bump 726, the fastening bump 726 slides in the inner fastening groove 537 and abuts against the inner fastening groove 537. The aforementioned inner fastening groove 537 may be an L-shaped groove, and the fastening bump 726 may be a horseshoe-shaped bump, which slides in the inner fastening groove 537 and then turns to slide and abut (i.e., forming an anti-rotation part with the function of anti-rotation or limiting positions or limiting directions).

Refer to FIG. 12, which is a schematic diagram of a variation of the fastening portion and the fastening hole engaging and abutting against each other of an embodiment of the present disclosure. As shown in FIG. 12, the fastening portion 533 includes two elastic hooks (elastic fastening body) 539, which are fastened by elastic force (i.e., forming an anti-rotation part with the function of anti-rotation or limiting positions or limiting directions).

Figure 13:
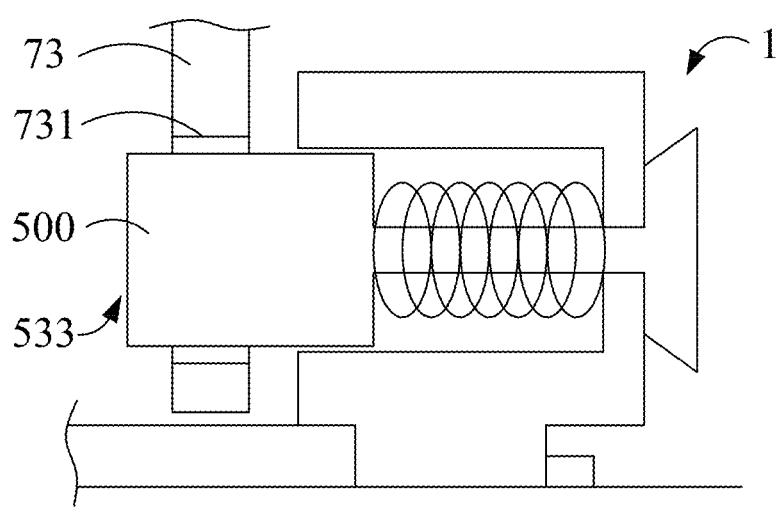
FIG. 13 is a schematic diagram of a variant of the fastening portion and the fastening hole engaging and abutting against each other of an embodiment of the present disclosure.
Figure 14:
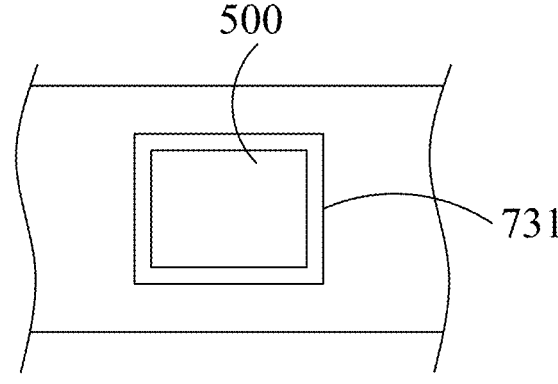
FIG. 14 is a cross-sectional view of FIG. 13.

Refer to FIGS. 13 and 14 at the same time. FIG. 13 is a schematic diagram of a variation of the fastening portion and the fastening hole engaging and abutting against each other of an embodiment of the present disclosure, and FIG. 14 is a cross-sectional view of FIG. 13. As shown in FIGS. 13 and 14, the fastener structure 1 includes a mating object 73 (e.g., chassis, circuit board), the mating object 73 includes a non-circular mating hole 731, the fastening portion part 533 includes a non-circular corresponding fastening portion 500, and the non-circular mating hole 731 and the non-circular corresponding fastening portion 500 correspond to each other in shape and join with each other (i.e., forming an anti-rotation part with the function of anti-rotation or limiting positions or limiting directions). In an embodiment, the non-circular mating hole 731 and the non-circular corresponding fastening portion 500 are rectangular, respectively, as shown in FIG. 14. Accordingly, the effect of limiting positions and/or limiting directions (anti-rotation) can also be achieved by forming an anti-rotation function through the structural design of the anti-rotation component.

Figures 15, 16, 17:
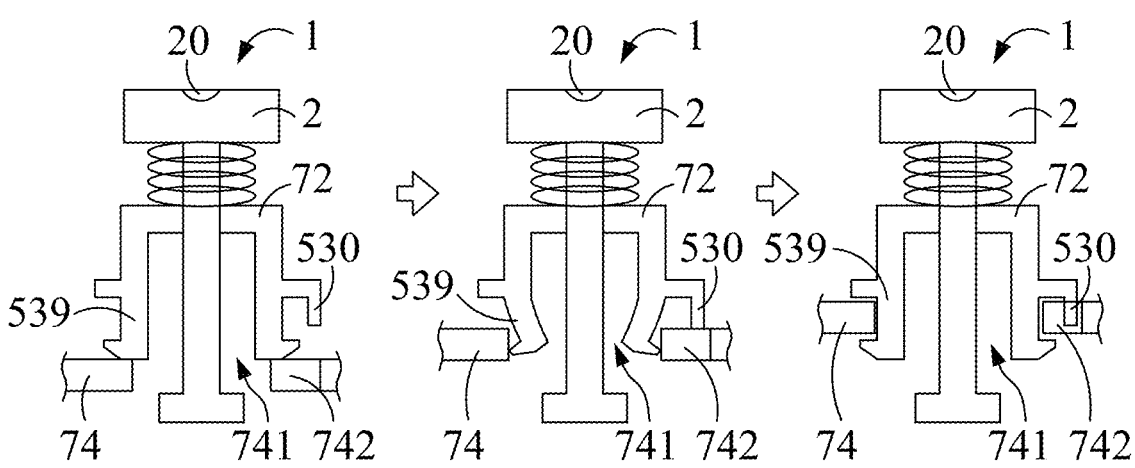
FIG. 15 is a schematic diagram illustrating the joining of mating objects and engaging members of an embodiment of the present disclosure.
FIG. 16 is a schematic diagram depicting the operational variations of FIG. 15.
FIG. 17 is a schematic diagram depicting the operational variations of FIG. 15.

Referring to FIGS. 15 to 17 at the same time, FIG. 15 is a schematic diagram of the mating object and the corresponding engaging member joining with each other of an embodiment of the present disclosure, FIG. 16 is a schematic diagram of an action change of FIG. 15, and FIG. 17 is a schematic diagram of the action change of FIG. 15. As shown in FIGS. 15 to 17, the fastener structure 1 further includes a mating object 74 and a corresponding engaging member 72 (e.g., may be regarded as a body portion in a non-restrictive embodiment), the mating object 74, for example, is a circuit board, and the mating object 74 includes a perforation (or groove) 741, the corresponding engaging member 72 includes two elastic hooks 539 (two elastic hooks 539 form an elastic hook as a whole). The two elastic hooks 539 elastically pass through the perforation 741 and engage and abut against the mating object 74 (i.e., forming an anti-rotation part with the function of anti-rotation or limiting positions or limiting directions). Thus, by elasticity, the fastening portion 533 (elastic hooks 539) can be firmly fastened to the mating object 74.

Figure 18:
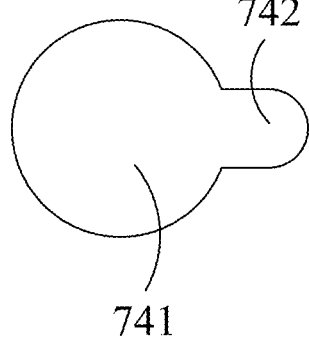
FIG. 18 is a top view of a perforation and a mating hole of FIG. 15.

Refer to FIG. 18, which is a top view of the perforation and a mating hole of FIG. 15, and also refer to FIG. 15 to FIG. 17 at the same time. One of the two elastic hooks 539 includes a protruding portion 530, the mating object 74 includes a mating hole 742, the perforation 741 and the mating hole 742 are communicated to each other, and the protruding portion 530 is inserted into and abutted against the mating hole 742 (i.e., forming an anti-rotation part with the function of anti-rotation or limiting positions or limiting directions). The aforementioned protruding portion 530 may also form an anti-rotation function to achieve the effect of limiting positions and/or limiting directions (anti-rotation).

Figures 19, 20, 21, 22:
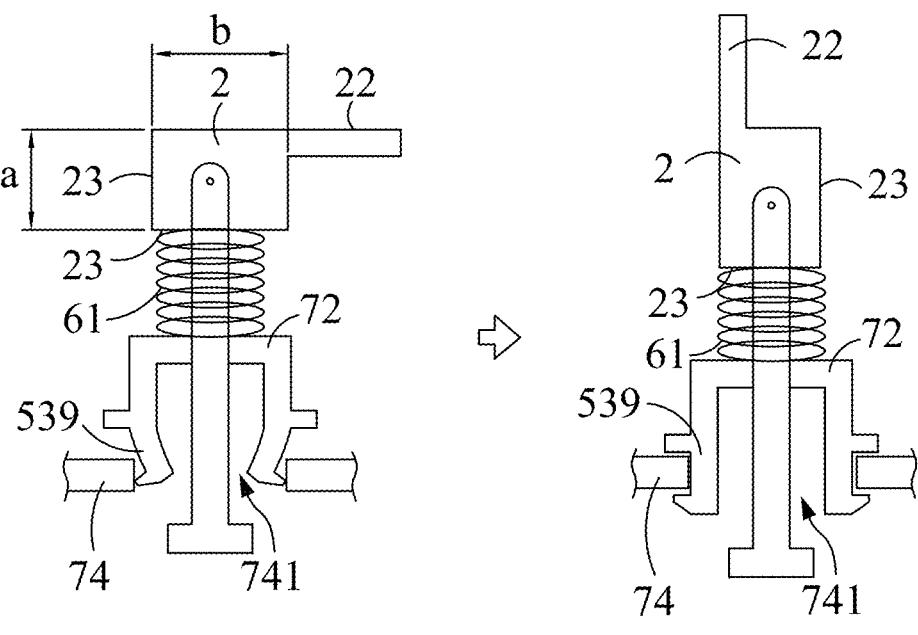
FIG. 19 is a schematic diagram illustrating the engagement between the rotating fastener body and a spring of an embodiment of the present disclosure.
FIG. 20 is a schematic diagram depicting the operational variations of FIG. 19.
FIG. 21 is a schematic diagram depicting the engagement between the rotating fastener body and the spring of an embodiment of the present disclosure.
FIG. 22 is a schematic diagram illustrating the operational variations of FIG. 21.

Referring to FIG. 19 and FIG. 20 at the same time, FIG. 19 is a schematic diagram of the rotating fastener body and the spring butting with each other of an embodiment of the present disclosure and FIG. 20 is a schematic diagram of the action change of FIG. 19. As shown in FIGS. 19 and 20, the rotating fastener body 2 includes two abutting surfaces 23 intersecting with each other and an operating protruding portion 22 and the spring 61 abut against one of the two abutting surfaces 23. In other words, for example, by pulling the operating protruding portion 22, the spring 61 abuts against one of the two abutting surfaces 23, and the elastic hooks 539 can be fastened to the mating object 74 by the elastic force of the spring 61.

Further, in FIGS. 19 and 20, each of the two abutting surfaces 23 has a length, marked a and b as shown in the figure, the length of each of the two abutting surfaces 23 is the same with or different from each other, so that different heights can be moved during rotation. In addition, the length of each of the two abutting surfaces 23 is not limited, and it may be designed to be equal or not equal to each other as necessary.

Referring to FIG. 21 and FIG. 22 at the same time, FIG. 21 is a schematic diagram of the rotating fastener body and the spring butting with each other of an embodiment of the present disclosure and FIG. 22 is a schematic diagram of the action change of FIG. 21. As shown in FIGS. 21 and 22, one of the two abutting surfaces 23 of the rotating fastener body 2 is arc-shaped, and in other embodiments, both the two abutting surfaces 23 may also be arc-shaped. In other words, when the operating protruding part 22 is pulled, the arc-shaped design can make a smoother action between rotating fastener body 2 and the spring 61. In addition, the spring 61 may also use the action of elastic force to cause a pushing force on the arc-shaped abutting surface 23, so that the rotating fastener body 2 has a more labor-saving and smoother rotation.

Figures 23, 24:
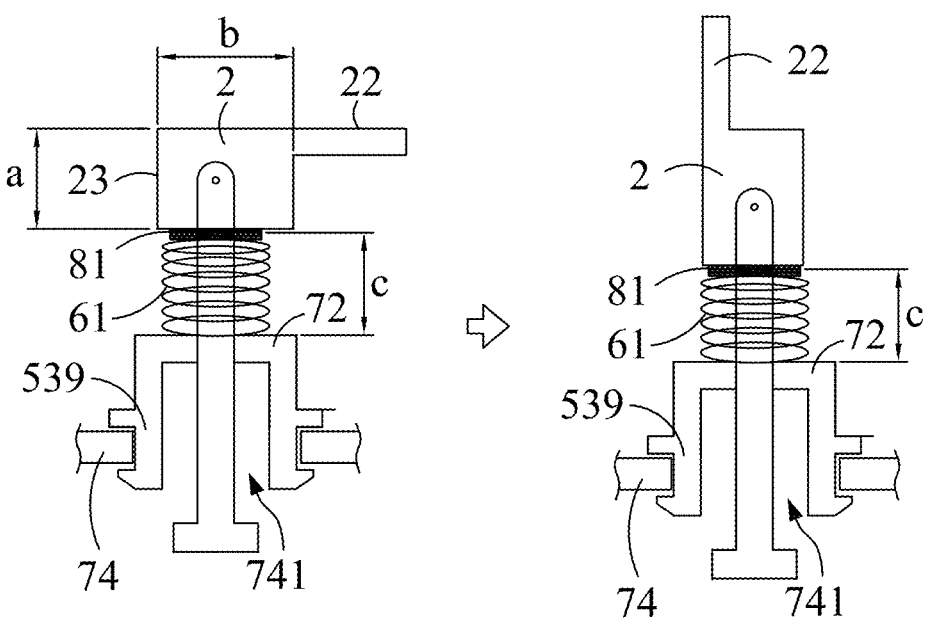
FIG. 23 is a schematic diagram depicting the engagement between the rotating fastener body and the spring of an embodiment of the present disclosure.
FIG. 24 is a schematic diagram illustrating the operational variations of FIG. 23.

Referring to FIG. 23 and FIG. 24 at the same time, FIG. 23 is a schematic diagram of the rotating fastener body and the spring butting with each other of an embodiment of the present disclosure and FIG. 24 is a schematic diagram of the action change of FIG. 23. As shown in FIGS. 23 and 24, the fastener structure 1 further includes an intermediator 81. The intermediator 81 is located between the rotating fastener body 2 and the spring 61 and adjacent to the rotating fastener body 2, and the spring 61 is abutted between the intermediator 81 and the main body 3. Accordingly, if the rotating fastener body 2 is designed to have a hollow space, the intermediator 81 may make the spring 61 firmly abut against the rotating fastener body 2 to stably provide the force of the spring 61 during rotation. Further, as shown in FIGS. 23 and 24, if the lengths (marked as a, b) of the two abutting surfaces 23 of the rotating fastener body 2 are different from each other, the distance (marked as c) at which the spring 61 is compressed will also be different, and the lengths of the two abutting surfaces 23 can be designed according to the need (e.g., the thickness of the object to be fastened).

Figures 25, 26:
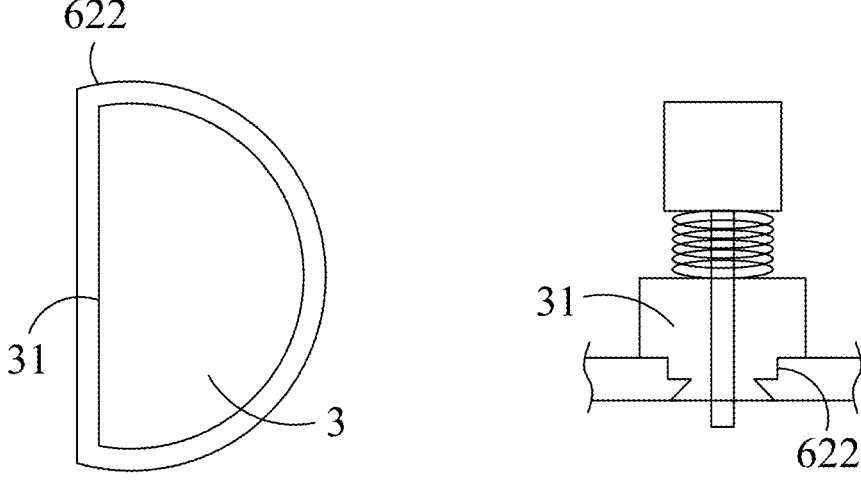
FIG. 25 is a schematic diagram illustrating the main body and the structural component joining with each other of an embodiment of the present disclosure.
FIG. 26 is a schematic diagram illustrating the changes in the joining of the main body and the structural component of an embodiment of the present disclosure.

Refer to FIG. 25, which is a schematic diagram of the main body and the structural component joining with each other of an embodiment of the present disclosure, and also refer to FIG. 1 and FIG. 2 at the same time. The fastener structure 1 further includes a structural component 62 in the form of a heat sink 623 as described above. The structural component 62 includes an assembled substrate 621 and the assembled substrate 621 includes a through hole, such as the non-circular through hole 622 shown in FIG. 25. The main body 3 includes a protruding body, such as the non-circular protruding body 31 shown in FIG. 25. The non-circular protruding body 31 and the non-circular through hole 622 correspond to each other in shape and join with each other (i.e., forming an anti-rotation part with the function of anti-rotation or limiting positions or limiting directions). That is, the main body 3 is joined on the assembled substrate 621 by the non-circular protruding body 31 joining with the non-circular through hole 622, and as shown in FIG. 25, the non-circular protruding body 31 and the non-circular through hole 622 are semi-circular, respectively. Similarly, the effect of limiting positions and/or limiting directions can also be achieved.

Refer to FIG. 26, which is a schematic diagram of a variation of the main body and the structural component joining with each other of an embodiment of the present disclosure. As shown in FIG. 26, the non-circular protruding body 31 and the non-circular through hole 622 are respectively step-shaped, so that they can also achieve the effect of anti-rotating or limiting positions or limiting directions with each other. Further, in order to make the non-circular protruding body 31 and the non-circular through hole 622 more firmly joined with each other, the non-circular protruding body 31 and the non-circular through hole 622 may be designed to correspond to each other at a beveled step shape.

Figure 27:
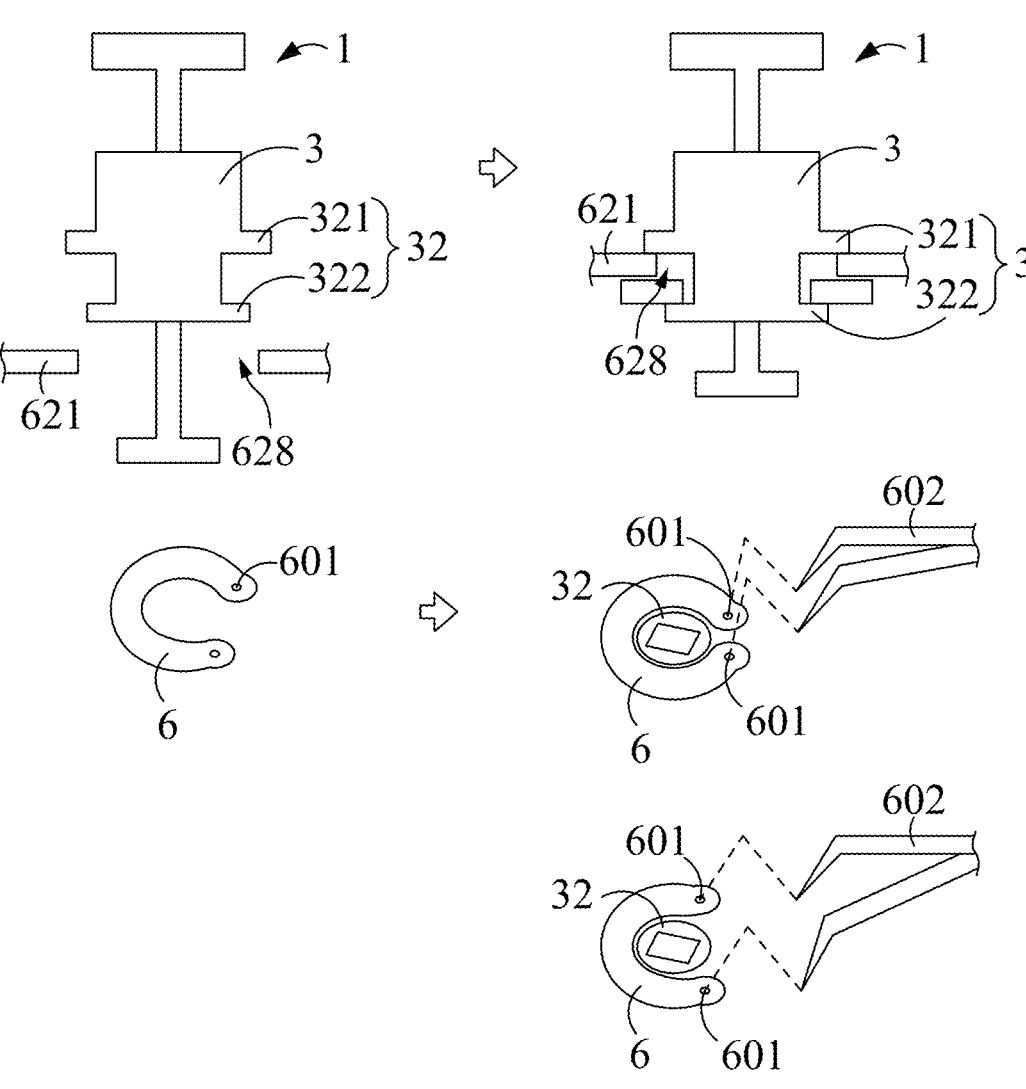
FIG. 27 is a schematic diagram illustrating the changes in the joining of the main body and the structural component of an embodiment of the present disclosure.

Refer to FIG. 27, which is a schematic diagram of a variation of the main body and the structural component joining with each other of an embodiment of the present disclosure, and also refer to FIG. 1 and FIG. 2 at the same time. The fastener structure 1 further includes a structural component 62 in the form of a heat sink 623 as described above (e.g., may be regarded as a butting object in a non-restrictive embodiment). The fastener structure 1 further includes an elastic fastener, such as the C-shaped (structural) elastic fastener 6 shown in FIG. 27. Further, the structural component 62 includes an assembled substrate 621 and the assembled substrate 621 includes a through hole (or groove section) 628. The main body 3 includes an assembling part 32, a cross-section of the assembling part 32 is I-shaped and includes an upper assembling part 321 and a lower assembling part 322, a length of the upper assembling part 321 is greater than a length of the lower assembling part 322, the length of the lower assembling part 322 is less than a diameter of the through hole 628, the assembling part 32 passes through the through hole 628 by the lower assembling part 322 and abuts against the assembled substrate 621 by the upper assembling part 321, the C-shaped elastic fastener 6 is sleeved around the assembling part 32 and is abutted between the assembled substrate 621 and the lower assembling part 322, when the C-shaped elastic fastener 6 is sleeved around the assembling part 32, it can first be flexibly stretched and laterally or straightly sleeved around and fastened into the assembling part 32 and then elastically restored. By the elastic abutting action of the C-shaped elastic fastener 6, a stable fastening can be formed between the main body 3 and the assembled substrate 621 of the structural component 62.

The above-mentioned C-shaped elastic fastener 6 can be heat treated to increase elasticity, and the C-shaped elastic fastener 6 may be a metal elastic fastener, plastic elastic fastener, rubber elastic fastener, or other elastic fasteners with elastic deformation characteristics.

Further, from FIG. 27, the C-shaped elastic fastener 6 has two operating parts 601, such as open ports, which may be operated to laterally stretch or operated to straightly stretch, and an operating tool 602 (e.g., a tweezer) may be used to insert into the operating parts 601 to stretch (e.g., laterally stretch or straightly stretch) the C-shaped elastic fastener 6, and as described above, the C-shaped elastic fastener 6 can first be flexibly stretched, and then laterally sleeved around the assembling part 32.

Figure 28:
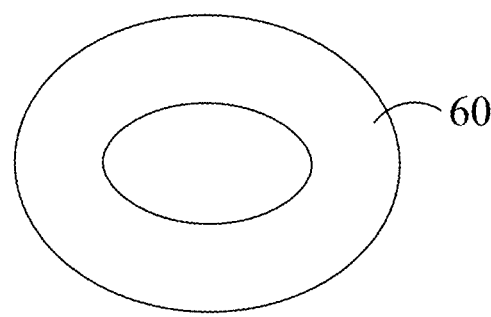
FIG. 28 is a schematic diagram illustrating variation of the elastic fastening component of an embodiment of the present disclosure.

Refer to FIG. 28, which is a schematic diagram of the alteration of the elastic fastener of an embodiment of the present disclosure. As shown in FIG. 28, the elastic fastener is a closed (structure) elastic fastener 60, such as an elastic rubber ring, which can also be flexibly stretched first and then carry out the sleeving and fastening action, certainly, the elastic fastener can also be an unclosed structure.

Figures 29, 30, 31:
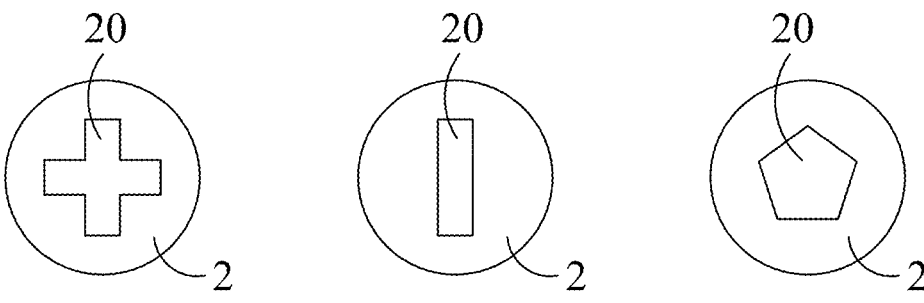
FIG. 29 is a schematic diagram illustrating the changes in an inner concave operating section of the rotating fastener body of an embodiment of the present disclosure.
FIG. 30 is a schematic diagram illustrating the changes in the inner concave operating section of the rotating fastener body of an embodiment of the present disclosure.
FIG. 31 is a schematic diagram illustrating variation in the inner concave operating section of the rotating fastener body of an embodiment of the present disclosure.

Referring to FIGS. 29 to 31 at the same time, FIG. 29 is a schematic diagram of a variant of an inner concave operating part of the rotating fastener body of an embodiment of the present disclosure, FIG. 30 is a schematic diagram of a variant of the inner concave operating part of the rotating fastener body of an embodiment of the present disclosure, and FIG. 31 is a schematic diagram of a variant of the inner concave operating part of the rotating fastener body of an embodiment of the present disclosure, and also refer to FIGS. 15 to 17 at the same time.

The rotating fastener body 2 includes an inner concave operating part 20, and the cross-section of the inner concave operating part 20 is cross-shaped (FIG. 29), a straight line (FIG. 30) or, for example, a polygonal shape such as pentagonal shape (FIG. 31), so that a tool (not shown) can be easily used to operate the rotating fastener body 2. Certainly, the shape of the cross-section of the aforementioned inner concave operating part 20 is not limited, such as a star (operated by a star driver) or a hexagonal shape (operated by a hexagonal wrench).

Figure 32:
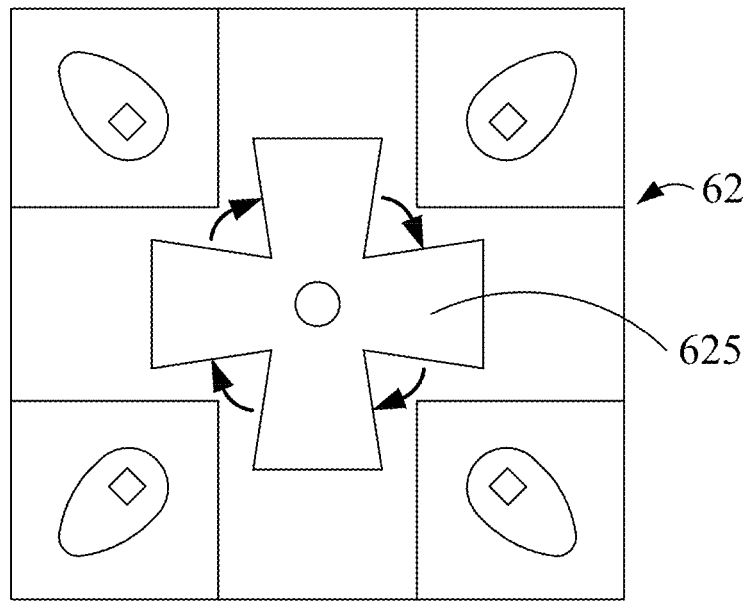
FIG. 32 is a top view of an embodiment of the present disclosure.
Figure 33:
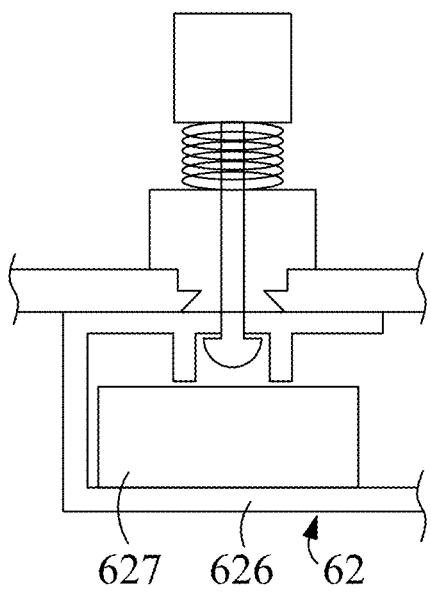
FIG. 33 is a cross-sectional diagram of an embodiment of the present disclosure.
Figure 34:
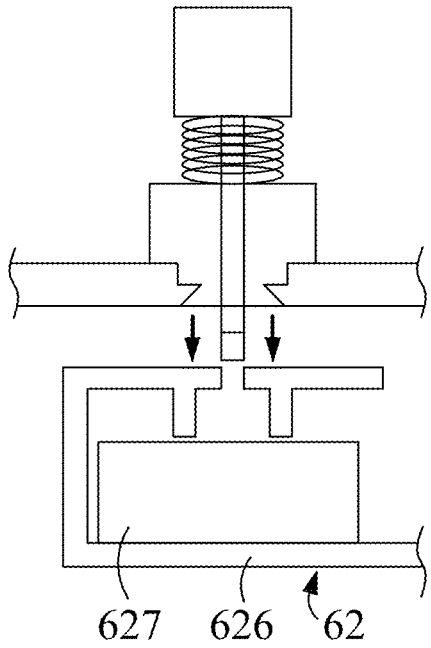
FIG. 34 is a cross-sectional diagram of an embodiment of the present disclosure.

Refer to FIG. 32 is a top view of an embodiment of the present disclosure. In FIG. 32, the structural component 62 is shown to be a cooling fan 625. Referring to FIG. 33 and FIG. 34 at the same time, FIG. 33 is a cross-sectional diagram of an embodiment of the present disclosure, and FIG. 34 is a cross-sectional diagram of an embodiment of the present disclosure. In FIGS. 33 to 34, the structural component 62 is shown to be a hard disk enclosure 626 for carrying a hard disk 627. In other words, the form of the structural component is not limited, for example, it can be a hard disk enclosure, a PCB, a heat dissipation element, a radiator, a heat sink, a fan, a removable hard disk enclosure, a chassis, or an IC, and can be fastened and anti-rotated by any of the above structural configurations.

Refer to FIG. 35, which is an exploded view of an embodiment of the present disclosure. A fastener structure 9 is shown in FIG. 35, and the fastener structure 9 includes a rotating fastener body 91 and a main body 92, wherein the rotating fastener body 91 includes an anti-rotation component 911 and a fastening portion 912, the main body 92 includes a first anti-rotation portion 921 and a second anti-rotation portion 922. In an embodiment, the anti-rotation portion 911 of the rotating fastener body 91 is a protruding long rod.

Figure 36:
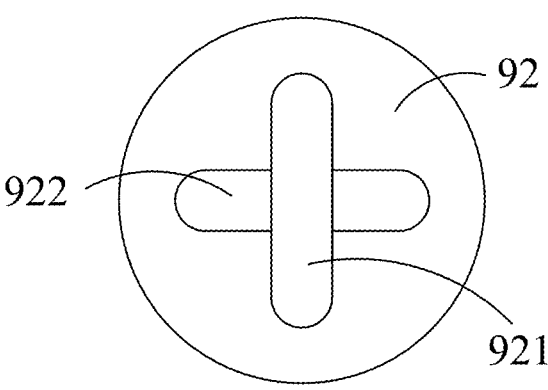
FIG. 36 is a top view of the main body of FIG. 35.

Refer to FIG. 36, which is a top view of the main body of FIG. 35, and also refer to FIG. 35. As shown in FIGS. 35 and 36, the first anti-rotation portion 921 and the second anti-rotation portion 922 of the main body 92 are correspondingly communicated to each other in an embodiment and is a non-grooving structure with upper and lower two-stage or upper and lower two-layer, and the first anti-rotation portion 921 and the second anti-rotation portion 922 are long grooves, respectively.

Figure 37:
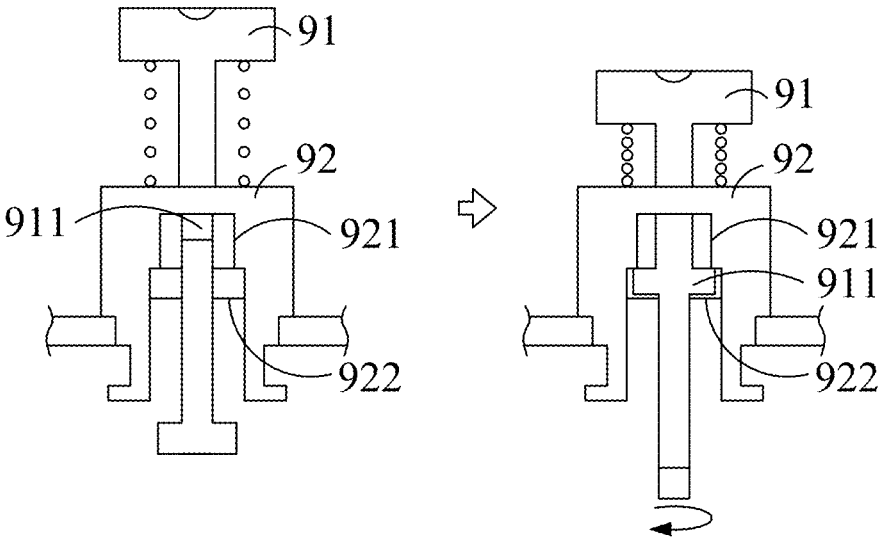
FIG. 37 is a schematic diagram illustrating the actuation of FIG. 35.

Refer to FIG. 37, which is a schematic diagram of the actuation of FIG. 35, and also refer to FIG. 35 at the same time. As shown in FIGS. 35 and 37, the anti-rotation portion 911 of the rotating fastener body 91 is used to move in the first anti-rotation portion 921 and the second anti-rotation portion 922 of the main body 92 to limit positions or control the direction or switch or movement of the fastening portion 912 of the rotating fastener body 91, for example, by pressing down on the rotating fastener body 91, the anti-rotation portion 911 (protruding long rod) of the rotating fastener body 91 may be fastened to the first anti-rotation portion 921 or the second anti-rotation portion 922 of the main body 92 (in the form of a long groove-like upper and lower two-step or upper and lower two-layer non-grooving structure).

Figure 38:
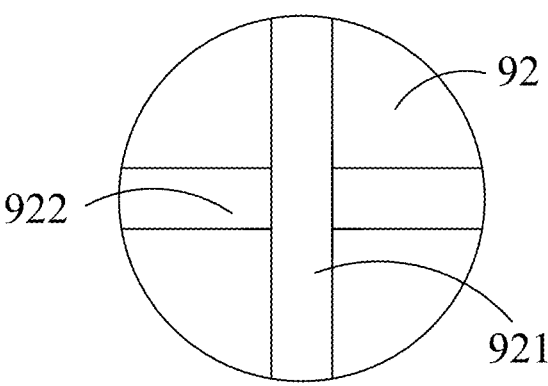
FIG. 38 is a schematic diagram illustrating structural variations of FIG. 36.

Refer to FIG. 38, which is a schematic diagram of a structural change of FIG. 36. As shown in FIG. 38, the first anti-rotation portion 921 and the second anti-rotation portion 922 of the main body 92 is a grooving structure with upper and lower two-stage or upper and lower two-layer.

Figure 39:
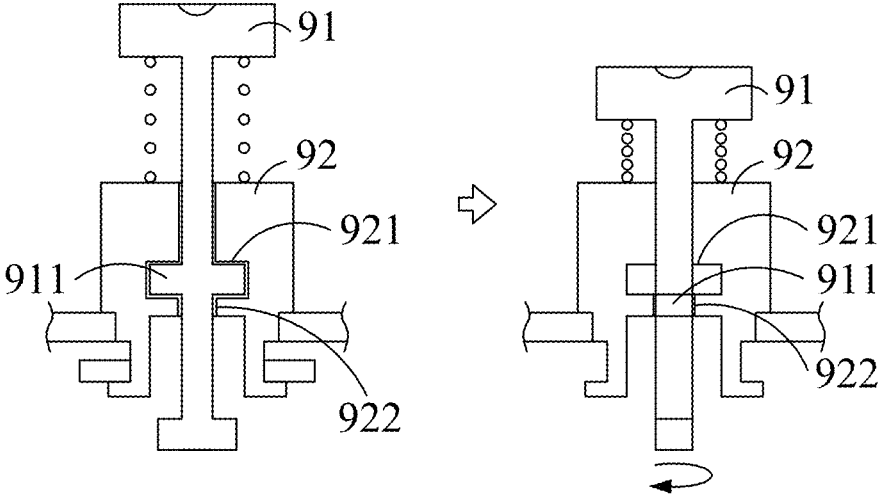
FIG. 39 is a schematic diagram illustrating structural variations of FIG. 37.

Refer to FIG. 39, which is a schematic diagram of a structural change of FIG. 37. The cross-sectional width of the first anti-rotation portion 921 and the second anti-rotation portion 922 shown in FIG. 39 is in an opposite change to the cross-sectional width of the first anti-rotation portion 921 and the second anti-rotation portion 922 shown in FIG. 37, that is, the cross-sectional width of the first anti-rotation portion 921 and the second anti-rotation portion 922 may be designed with a change that the upper is wide and the lower is narrow or the upper is narrow and the lower is wide.

In addition, in terms of structural design, one of the first anti-rotation portion 921 and the second anti-rotation portion 922 is a grooving structure, the other is a non-grooving structure, or both are grooving structures, or both are non-grooving structures.

Figure 41:
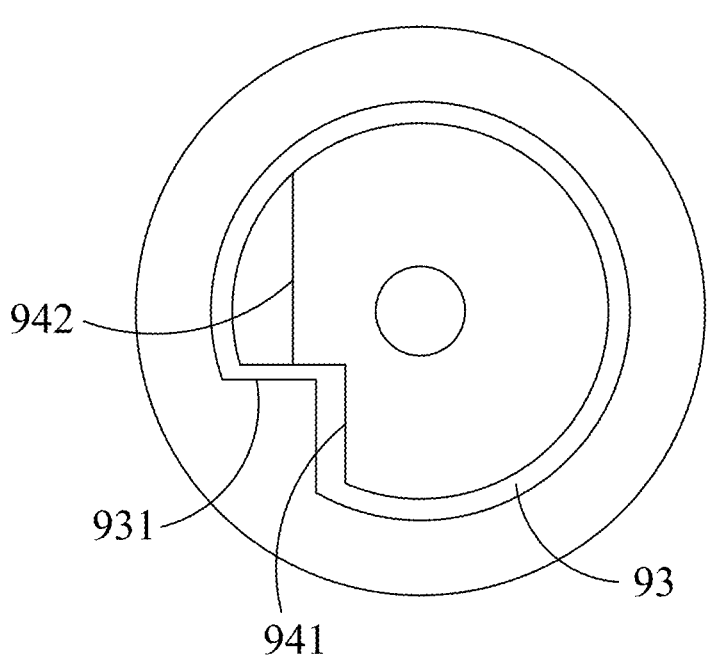
FIG. 41 is a top view illustrating the assembled configuration of FIG. 40.

Referring to FIG. 40 and FIG. 41 at the same time, FIG. 40 is an exploded view of an embodiment of the present disclosure, and FIG. 41 is a top view of FIG. 40 after combination. A fastener structure 901 is shown in FIGS. 40 and 41, and the fastener structure 901 includes a rotating fastener body 93 and a main body 94, wherein the rotating fastener body 93 includes an anti-rotation portion 931 and a fastening portion 932, the main body 94 includes a first anti-rotation portion 941 and a second anti-rotation portion 942.

Similarly, the first anti-rotation portion 941 and the second anti-rotation portion 942 of the main body 94 in an embodiment is an upper and lower two-stage or upper and lower two-layer structure, and from a top-down view, the first anti-rotation portion 941 and the second anti-rotation portion 942 are misaligned with each other. When the rotating fastener body 93 is not pressed down, the anti-rotation portion 931 of the rotating fastener body 93 will be fastened to the first anti-rotation portion 941 of the main body 94, as shown in FIG. 41.

Figure 42:
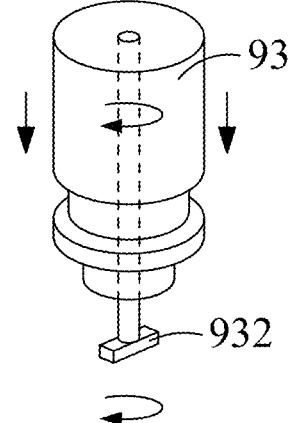
FIG. 42 is a schematic diagram illustrating operation of the rotating fastener body of FIG. 40.
Figure 43:
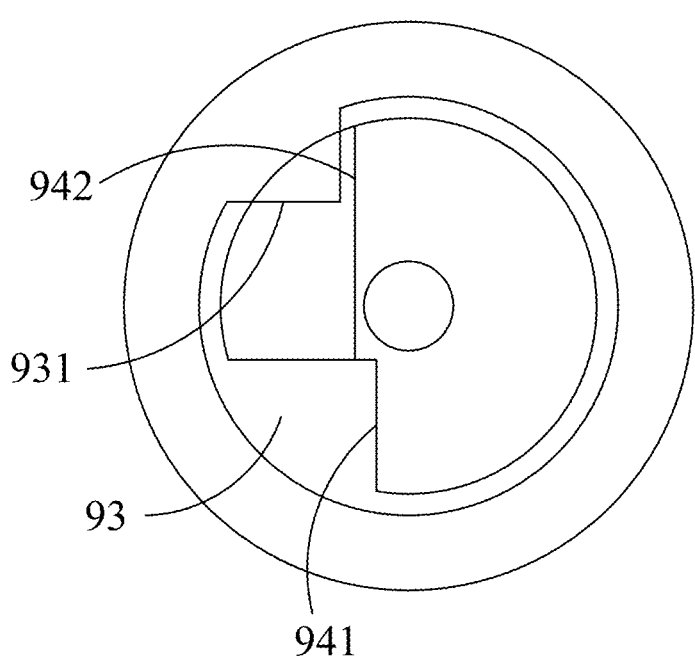
FIG. 43 is a top view illustrating the rotating fastener body after actuating in FIG. 42.

Refer to FIG. 42, which is a schematic diagram of the actuation of the rotating fastener body of FIG. 40. As shown in FIG. 42, as the rotating fastener body 93 is rotated and pressed down, the fastening portion 932 rotates. Refer to FIG. 43, which is a top view after the rotating fastener body actuating in FIG. 42. As shown in FIG. 43, after the rotating fastener body 93 is rotated and pressed down, the anti-rotation portion 931 of the rotating fastener body 93 will be fastened to the second anti-rotation portion 942 of the main body 94.

Figure 44:
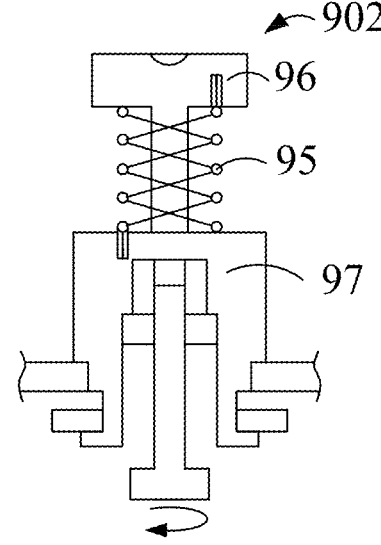
FIG. 44 is a cross-sectional diagram of an embodiment of the present disclosure.

Refer to FIG. 44, which is a cross-sectional view of an embodiment of the present disclosure. As shown in FIG. 44, the fastener structure 902 further includes a torsion spring 95, two ends of the torsion spring 95 are respectively assembled at the rotating fastener body 96 and the main body 97, by the torque action of the torsion spring 95, it can be used to automatically rotate and fasten the rotating fastener body 96.

Figure 45:
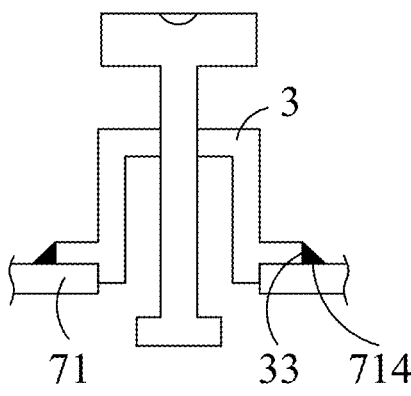
FIG. 45 is a cross-sectional diagram illustrating the combined main body and the mating object of the present disclosure.
Figure 46:
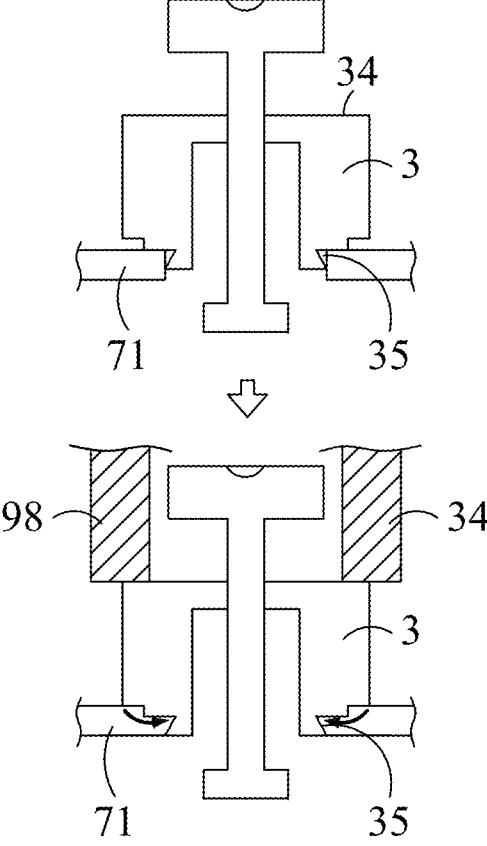
FIG. 46 is a cross-sectional diagram illustrating the combined main body and the mating object of the present disclosure.
Figure 47:
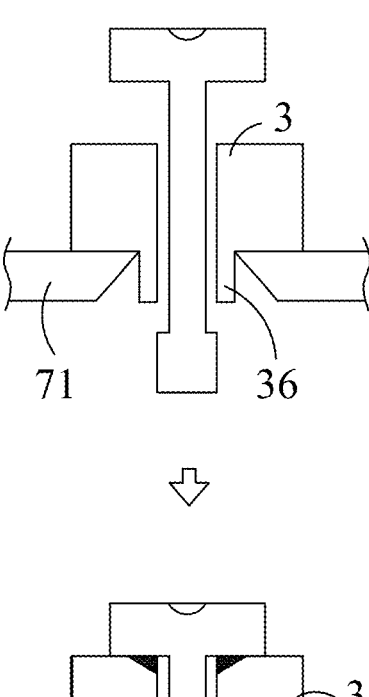
FIG. 47 is a cross-sectional diagram illustrating the combined main body and the mating object of the present disclosure.

Referring to FIGS. 45 to 47, FIGS. 45 to 47 are cross-sectional views of a combination of the main body and the mating object of the present disclosure. The mating object 71 may be an aluminum object, a copper object, a metal object, an aluminum radiator, a copper radiator, a metal radiator, or a printed circuit board. The main body 3 is combined with the mating object 71 by pressure applying, expanding connection, soldering, locking, or fastening, thereby selecting the required manner so that the main body 3 and the mating object 71 are firmly combined.

As shown in FIG. 45, the main body 3 has a solderable surface 33 (or a soldering tin layer) for soldering to the mating object 71 having a soldering tin layer 714 (or a solderable surface), whereby the main body 3 and the mating object 71 are firmly combined.

As shown in FIG. 46, the main body 3 has a pressure applying part 34 and a material entering part 35, a mold 98 may apply pressure on the pressure applying part 34, so that the pressure applying part 34 applies pressure on the mating object 71, and thus the material of the mating object 71 enters or flows into the material entering part 35, so that the main body 3 is pressed in or assembled in the mating object 70, whereby the main body 3 and the mating object 71 are firmly combined.

As shown in FIG. 47, the main body 3 has an expanding connection part 36, the expanding connection part 36 is used to be applied pressure by the mold 98 with an external force, so that the expanding connection part 36 is expanded to connect to the mating object 71, whereby the main body 3 and the mating object 71 are firmly combined.

While the present invention has been described by means of specific embodiments, those skilled in the art should understand the above description is merely embodiments of the invention, and it should not be considered to limit the scope of the invention. It should be noted that all changes and substitutions which come within the meaning and range of equivalency of the embodiments are intended to be embraced in the scope of the invention. Therefore, the scope of the invention is defined by the claims.

What is claimed is:

1. A fastener structure, comprising:
a rotating fastener body;
a main body, wherein the main body and the rotating fastener body are anti-rotated with each other by an anti-rotation portion;
a connecting rod, wherein a first end part of the connecting rod penetrates the rotating fastener body, and a second end part of the connecting rod is disposed at the main body; and
a corresponding engaging member, including a fastening hole, wherein the second end part of the connecting rod extends to form a fastening portion to engage and abut against the fastening hole,
wherein the fastening hole is a long strip and the fastening portion is a long strip, and the fastening portion enters the fastening hole in a corresponding same direction and then rotates to produce an engaging and abutting effect of a function of anti-rotation.

2. A fastener structure, comprising:
a rotating fastener body; and
a main body, wherein the main body and the rotating fastener body are anti-rotated with each other, wherein the rotating fastener body comprises an anti-rotation portion and a fastening portion, and the main body comprises a first anti-rotation portion and a second anti-rotation portion, and wherein the anti-rotation portion of the rotating fastener body is configured to move in the first anti-rotation portion and the second anti-rotation portion of the main body to limit positions of the fastening portion of the rotating fastener body.

* * * * *